United States Patent
Pang

(10) Patent No.: US 9,940,892 B2
(45) Date of Patent: Apr. 10, 2018

(54) FLEXIBLE DISPLAY DEVICE

(71) Applicant: LG Display Co., Ltd., Seoul (KR)

(72) Inventor: Hee Suk Pang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/693,869

(22) Filed: Apr. 23, 2015

(65) Prior Publication Data

US 2015/0340004 A1 Nov. 26, 2015

(30) Foreign Application Priority Data

May 20, 2014 (KR) ........................ 10-2014-0060221
Mar. 24, 2015 (KR) ........................ 10-2015-0040469

(51) Int. Cl.
*G09G 5/00* (2006.01)
*G09G 5/18* (2006.01)
*G06F 1/16* (2006.01)
*G09F 9/30* (2006.01)

(52) U.S. Cl.
CPC ............. *G09G 5/00* (2013.01); *G06F 1/1652* (2013.01); *G09F 9/301* (2013.01); *G09G 5/18* (2013.01); *G09G 2300/04* (2013.01); *G09G 2380/02* (2013.01)

(58) Field of Classification Search
CPC ........ G09G 5/00; G09G 5/18; G09G 2380/02; G09G 2300/04; G06F 1/1652; G09F 9/301
USPC ........................................................ 345/205
See application file for complete search history.

(56) References Cited

U.S. PATENT DOCUMENTS

| 7,261,266 | B2* | 8/2007 | Satterfield ........... B60R 11/0235 248/284.1 |
| 7,558,057 | B1 | 7/2009 | Naksen et al. |
| 2005/0040962 | A1 | 2/2005 | Funkhouser et al. |
| 2006/0118461 | A1* | 6/2006 | Calendrille, Jr. .... B65D 5/4204 206/779 |

(Continued)

FOREIGN PATENT DOCUMENTS

| CN | 101163163 A | 4/2008 |
| CN | 201185067 Y | 1/2009 |

(Continued)

OTHER PUBLICATIONS

European Patent Office, European Search Report and Opinion, European Patent Application No. 15165584.2, dated Oct. 26, 2015, nine pages.

(Continued)

*Primary Examiner* — Fred Tzeng
(74) *Attorney, Agent, or Firm* — Fenwick & West LLP

(57) ABSTRACT

A flexible display device is disclosed which includes: a display unit; a support unit configured to selectively support the display unit; a connection unit configured to attach together one edge of the display unit and one edge of the support unit; and a driving unit connected to the other edge of the display unit and the other edge of the support unit and configured to control a plurality of operations. The plurality of operations includes a first operation, which allows the display unit and the support unit to come in contact with each other and to maintain a relatively flattened state of the display unit, and a second operation which enables the display unit and the support unit to be separated from each other for stowage.

18 Claims, 9 Drawing Sheets

(56) References Cited

U.S. PATENT DOCUMENTS

| | | | |
|---|---|---|---|
| 2009/0290076 A1* | 11/2009 | Tait | G09F 9/33 348/836 |
| 2012/0204453 A1 | 8/2012 | Jung | |
| 2013/0232835 A1* | 9/2013 | Davis | G09F 9/33 40/606.14 |

FOREIGN PATENT DOCUMENTS

| | | |
|---|---|---|
| EP | 2 538 400 A1 | 12/2012 |
| EP | 2 546 721 A2 | 1/2013 |
| WO | WO 2003/043294 A1 | 5/2003 |
| WO | WO 2005/020190 A2 | 3/2005 |

OTHER PUBLICATIONS

Chinese First Office Action, Chinese Application No. 201510206543.3, dated Jun. 27, 2017, 11 pages.

* cited by examiner

FLEXIBLE DISPLAY DEVICE

CROSS REFERENCE TO RELATED APPLICATION

This application claims the benefit of Korean Patent Application No. 10-2014-0060221, filed on May 20, 2014 entitled "FLEXIBLE DISPLAY MODULE AND FLEXIBLE DISPLAY DEVICE" and Korean Patent Application No. 10-2015-0040469, filed on Mar. 24, 2015 entitled "FLEXIBLE DISPLAY DEVICE", which are hereby incorporated by reference in their entirety into this application.

BACKGROUND

Field of the Disclosure

The present application relates to a flexible display device.

Description of the Related Art

Nowadays, portable terminals such as a wireless terminal, a personal digital assistant (PDA), a portable multimedia player (PMP), an electronic notebook and so on are being trendily made small-sized for portability. Such portable terminals supply users with a variety of information such as character information, motion images, still images, MP3, game and so on through their screens. As such, the portable terminals each require a display unit to enlarge or widen the screen.

Meanwhile, miniaturization of the portable terminals forces the screen of the display unit to be small-sized. Due to this, it is difficult to satisfy both of the two requirements.

To address this matter, a portable terminal adopting a flexible display unit is being recently introduced. For example, a cylindered portable terminal can be introduced. The cylindered portable terminal rolls the flexible display unit and preserves the flexible display device in a rolled state when an active matrix screen is not used. The flexible display unit includes a display panel which uses a thin plastic substrate instead of a glass substrate.

However, the flexible display unit ejected from a body must have lower flatness than that of a rigid display unit using a glass substrate because of its high flexibility. Also, as the flexible display unit is preserved within the body in the rolled state, the flexible display unit ejected from the body must be re-rolled or curved due to restoring force which enables the flexible display unit to return to the rolled state.

BRIEF SUMMARY

Accordingly, embodiments of the present application are directed to a flexible display device that substantially obviates one or more of problems due to the limitations and disadvantages of the related art.

The embodiments are to provide a flexible display device which enables a display unit preserved within a body in a rolled state to maintain a flattened state at use.

Also, the embodiments are to provide a flexible display device which allows a display unit to maintain a rigidly flattened state by bringing a support unit into close contact with the display unit when the display unit preserved within a body in a rolled state is externally ejected.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

A flexible display device according to an aspect of the present embodiment includes a display unit, a support unit, a connection unit and a driving unit. The support unit is used to selectively support the display unit, and the connection unit is used to attach together one edge of the display unit and one edge of the support unit. The driving unit is connected to the other edge of the display unit and the other edge of the support unit and used to control a plurality of operations. The plurality of operations includes a first operation, which allows the display unit and the support unit to come in contact with each other and to maintain a relatively flattened state, and a second operation which enables the display unit and the support unit to be separated from each other for stowage.

Preferably, the first operation allows a back surface of the display unit and a back surface of the support unit to come in contact with each other with gradually increasing their surface contact area under control of the driving unit, and the second operation enables the back surface of the display unit and the back surface of the support unit to be separated from each other with gradually decreasing their surface contact area under control of the driving unit.

The driving unit includes a first driving means configured to control the display unit and a second driving means configured to control the support unit. The first driving means and the second driving means rotate along rotation directions opposite to each other during the first operation and the second operation. To this end, it is preferable that the first driving means and the second driving means are configured to be simultaneously driven.

The first driving means includes a first driving shaft onto which multi-turn coils are attached, first fixation members disposed at both ends of the first driving shaft, and a first rotating body configured to wrap the first driving shaft and have a magnetic property; and the second driving means including a second driving shaft onto which multi-turn coils are attached, second fixation members disposed at both ends of the second driving shaft, and a second rotating body configured to wrap the second driving shaft and have a magnetic property. In this case, the first driving shaft and the second driving shaft are in a fixed state, but the first rotating body and the second rotating body roll or unroll the display unit and the support unit by rotating along rotation directions opposite to each other. However, the first and second driving means are not limited to these.

In the flexible display device according to an aspect of the present embodiment, not only the display unit and the support unit are rolled out for usage under the control of the driving unit at the first operation but also the display unit and the support unit are rolled in for stowage under the control of the driving unit at the second operation. Also, it is preferable that the display unit and the support unit being rolled out in the first operation receive substantially equal forces and the rolled out display unit maintains the flattened state until another operation instead of the first operation is performed by the driving unit.

A flexible display device according to another aspect of the present embodiment includes a display unit and a support unit which are rolled in or rolled out by a plurality of driving means. As needed, the flexible display device further includes a connection unit configured to bring one edge of the display unit into contact with one edge of the support unit.

The plurality of driving means are simultaneously driven in a mode which allows restoring forces of the display unit and the support unit to be directionally opposite to each other in order to offset the restoring force of the display unit and the restoring force of the support unit, when the display unit and the support unit are rolled out.

The display unit is connected to one driving means among the plurality of driving means, and the support unit is connected to another driving means among the plurality of driving means. When the display unit and the support unit are rolled in or roll out, the one driving means connected to the display unit and the other driving means connected to the support unit rotate in directions opposite to each other.

The support unit preferably has a thickness suitable to have a substantially equal restoring force to that of the display unit when the display unit and the support unit are rolled out.

Also, the support unit has a thermal expansion coefficient with a difference below ±5% compared to the thermal expansion coefficient of the display unit. In this case, the restoring force of the display unit can be offset each other and the display unit maintains a flattened state when the display unit and the support unit are rolled out.

Also, the flexible display device further comprises a connection unit configured to connect one edge of the display unit with one edge of the support unit.

A flexible display device according to still another aspect of the present embodiment includes: a display unit configured to display images; a support unit configured to support the display unit; a first driving means configured to roll and unroll the display unit; a second driving means configured to roll or unroll the support unit; and a connection unit configured to fasten one edge of the display unit to one edge of the support unit.

The first driving means and the second driving means preferably rotate in directions that are opposite to each other.

In detail, the display unit and the support unit are unrolled together by the first driving means and the second driving means operating together. Also, the display unit and the support unit are rotated by the first driving means and the second driving means respectively, the display unit and the support unit are rolled in by being separated from each other until the connection unit is reached.

As an example, the first driving means includes a first driving shaft and first gears disposed at both ends of the first driving shaft, and the second driving means includes a second driving shaft and second gears disposed at both ends of the second driving shaft. In this case, the first driving shaft and the second driving shaft are configured to simultaneously rotate by engaging the first gears with the second gears.

Alternatively, the first driving means includes a first driving shaft onto which multi-turn coils are attached, first fixation members disposed at both ends of the first driving shaft, and a first rotating body configured to wrap the first driving shaft and have a magnetic property; and the second driving means includes a second driving shaft onto which multi-turn coils are attached, second fixation members disposed at both ends of the second driving shaft, and a second rotating body configured to wrap the second driving shaft and have a magnetic property. In this case, the first driving shaft and the second driving shaft are fastened, but the first rotating body and the second rotating body roll or unroll the display unit and the support unit by rotating in directions that are opposite to each other.

Such flexible display devices according to aspects of the present embodiment can allow the display unit disposed within the housing in the rolled state to maintain a relatively flattened state at the use of the display unit.

Also, the flexible display devices according to aspects of the present embodiment can enable the display unit to be in close contact with the support unit when the display unit disposed within the housing in the rolled state is externally ejected. In accordance therewith, the ejected display unit can maintain a rigidly flattened state.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
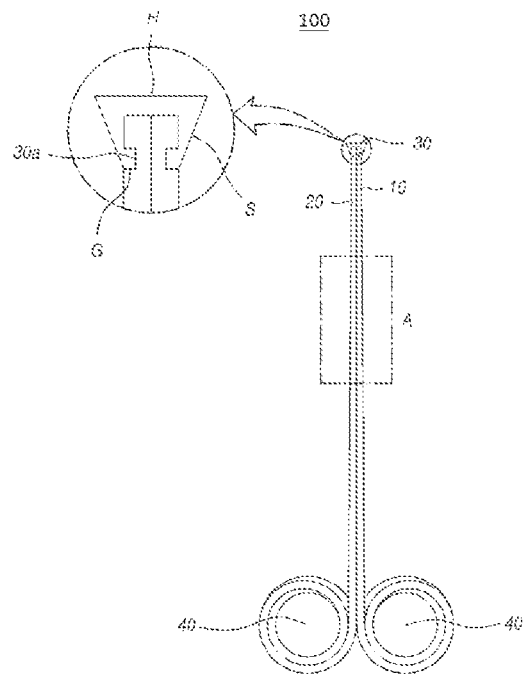
FIG. 1 is a cross-sectional view showing the structure of a flexible display device according to a first embodiment of the present disclosure.

Advantages and features of the present disclosure, and implementation methods thereof will be clarified through the following embodiments described with reference to the accompanying drawings. These embodiments introduced hereinafter are provided as examples in order to convey their spirits to the ordinary skilled person in the art. As such, these embodiments might be embodied in a different shape, so are not limited to these embodiments described here. Therefore, the present disclosure must be defined by scopes of claims.

In the following description, numerous specific details are set forth, such as particular structures, sizes, ratios, angles, coefficients and so on, in order to provide an understanding of the various embodiments of the present disclosure. However, it will be appreciated by one of ordinary skill in the art that the various embodiments of the present disclosure may be practiced without these specific details. The same reference numbers will be used throughout this disclosure to refer to the same or like parts. In other instances, well-known technologies have not been described in detail in order to avoid obscuring the present disclosure.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. As used herein, the singular forms "a", "an" and "the" are intended to include the plural forms as well, unless the context clearly indicates otherwise.

Elements used in the present disclosure without additional specific details must be considered to include tolerance.

In the description of embodiments, when a structure is described as being positioned "on or above" or "under or below" another structure, this description should be construed as including a case in which the structures contact each other as well as a case in which a third structure is disposed therebetween.

The temporal terms of "after", "subsequently", "next", "before" and so on used in this disclosure without specifying "immediately" or "directly" can include other discontinuously temporal relations.

Moreover, although some of the elements are designated with numerical terms (e.g., first, second, third, etc.), it should be understood that such designations are only used to specify one element from a group of similar elements, but not to limit the element in any specific order. As such, an element designated as a first element could be termed as a second element or as third element without departing from the scope of exemplary embodiments.

The features of various exemplary embodiments of the present disclosure may be partially or entirely bound or combined with each other, and be technically engaged and driven using various methods as apparent to those skilled in the art, and the exemplary embodiments may be independently practiced alone or in combination.

Hereinafter, embodiments of the present disclosure will be described with reference to the accompanying drawings.

Figure 2:
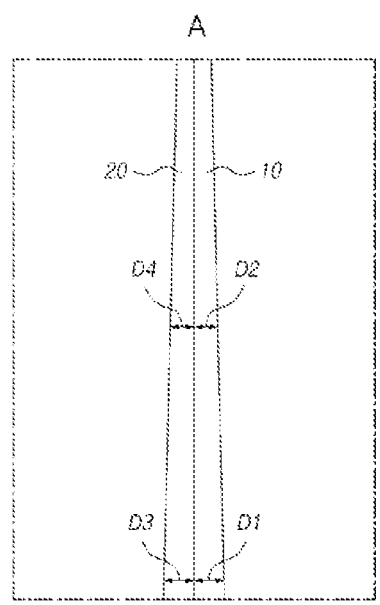
FIG. 2 is a cross-sectional view largely showing a portion A in FIG. 1.

FIG. 1 is a cross-sectional view showing the structure of a flexible display device according to a first embodiment of the present disclosure. FIG. 2 is a cross-sectional view largely showing a portion A in FIG. 1. As shown in FIG. 1, a flexible display device according to a first embodiment of the present disclosure includes a display unit 10, a support unit 20, a connection unit 30 and a driving unit 40.

The display unit 10 is used to display images. As an example of the display unit 10, a display panel such as an OLED (organic light emitting diode) display panel or others can be used. Such a display panel can be formed in a tetragonal shape. For example, the display panel can be formed in a wide screen shape with a larger horizontal width than a vertical width. However, the display panel is not limited to this. In other words, the display panel can be formed in one of an elliptical shape, a circular shape, a triangular shape and a rhombic shape.

Although it is not shown in the drawing, a protective layer used to protect the display panel can be included in the display unit 10. The protective layer can be disposed on an outer surface of the display panel. In other words, the protective layer can be disposed on one surface of the display panel opposite to the other surface being in contact with the support unit 20.

The protective layer is preferably formed from a material with superior abrasion resistance, superior scratch resistance and a coefficient of thermal expansion similar to that of the display panel of the display unit 10. This results from the fact that the display unit 10 must be bent due to difference between expansive degrees of the protective layer and the display panel enlarged in accordance with temperature when the difference between thermal expansion coefficients of the protective layer and the display panel becomes larger. In detail, it is preferable to form the protective layer using a material which has a thermal expansion coefficient with a difference below ±5% compared to the thermal expansion coefficient of the display panel.

Also, the protective layer preferably has light transmittance above 90%. If the light transmittance of the protective layer is below 90%, brightness of the display panel must be lowered and furthermore display quality of the display panel must deteriorate.

For example, the protective layer can be formed from either glass or a plastic film material such as polyethyleneterephthalate (PET) or others. However, the protective layer is not limited to this.

Such a protective layer can be attached on one surface of the display panel using one of a liquefied adhesive and a solidified adhesive. For example, the protective layer can be attached on the display panel by coating a liquefied adhesive on one surface of any one of the display panel and the protective layer, laminating the display panel and the protective layer, and hardening the adhesive with applying either heat or light. Alternatively, the protective layer can be attached on the display panel by putting a solidified adhesive film on one surface of the protective layer and then sticking the protective layer, which is provided with the solidified adhesive film, on the display panel.

If the protective layer is attached on the display panel as described above, not only damage of the display panel due to an external pressure such as a touch of a user can be minimized but also contamination of the display panel can be prevented.

The display unit 10 preferably has an average thickness of about 100 μm~1300 μm, but the present disclosure is not limited to this. The average thickness of the display unit 10 can be determined by the following expression: (a maximum thickness+a minimum thickness)/2. If the display unit 10 has the above-mentioned thickness range, not only an excessive warp phenomenon of the display unit 10 can be prevented but also damage of the display unit 10 due to external pressure can be minimized, when the display unit 10 is rolled out. As such, the display unit 10 can realize an easily touch. Also, when the display unit is rolled in, damage of the display unit 10 caused by not being smoothly rolled due to its thickness can be prevented. Meanwhile, when the display unit 10 includes the display panel and the protective layer, the thickness of the display unit 10 can become a total thickness of the display panel and the protective layer. On the other hand, the thickness of the display unit 10 including only the display panel corresponds to that of the display panel.

The support unit 20 is used to selectively support the display unit 10. In detail, the support unit 20 comes in close contact with the display unit 10 and is offset by the restoring force of the display unit 10 when the display device 10 is rolled out by the driving unit 40 which will be described later. As such, the display unit 10 can maintain a relatively flattened state. To this end, the support unit 20 preferably has the same shape as the display unit 10.

Such a support unit 20 can be formed from one of a metal material, a plastic material and so on. For example, the support unit 20 can be formed from one of aluminum Al, lithium Li, magnesium Mg, Silver Ag, copper Cu, cobalt Co, zinc Zn and alloys thereof, but it is not limited to this. When the support unit 20 is formed from a plastic material, one of a thermoplastic resin and a thermosetting resin can be used in the formation of the support unit 20. For example, the support unit 20 can be formed from a polymer selected from a material group which includes polyether ether ketone (PEEK), polyether ketone (PEK), polycarbonate (PC), polyethyleneterephthalate (PET), polymethylmethacrylate (PMMA) and mixtures thereof.

Also, the support unit 20 is formed in a single layer as shown in the drawing, but it is not limited to this. In other words, the support unit 20 can be formed in a multi-layered structure with at least two layers.

Moreover, the support unit 20 can become a transparent substrate. In this case, an image on the display unit 10 can be viewed from the front of the support unit 20.

Alternatively, the support unit 20 can become a display panel, like the display unit 10. For example, the support unit 20 can be a flexible display panel including the organic light emitting diodes, like the display unit 10. In this case, the support unit and the display unit 10 are used to not only support each other but also realize a flexible display device with a bilateral display function.

Preferably, the support unit 20 has a thermal expansion coefficient being similar to that of the display unit 10. This results from the fact that the display unit 10 and the support unit 20 must be bent toward one side of themselves due to difference between expansive degrees of the display unit 10 and the support unit 20 enlarged in accordance with temperature when the difference between thermal expansion coefficients of the display unit 10 and the support unit 20 becomes larger. In detail, the support unit 20 preferably has a thermal expansion coefficient with a difference below ±5% compared to the thermal expansion coefficient of the display unit 10. If the support unit 20 has the above-mentioned thermal expansion coefficient range, when the display unit 10 and the support unit 20 are rolled out, the restoring force of the display unit 10 is offset by the restoring force of the support unit 20. As such, the display unit 10 can maintain a flattened state.

Further, the thickness of the support unit 20 can be varied along the formation material of the support unit 20. Preferably, the support unit is formed in a thickness range suitable to have a restoring force substantially equal to that of the display unit 10 when the display unit 10 and the support unit 20 are rolled out.

If the display unit 10 and the support unit 20 each have a large area, the display unit 10 and the support unit 20 can be formed to each have different thicknesses in their top and bottom portions. However, they are not limited to this.

When the area of the display unit 10 increases, the area of the support unit is enlarged. Due to this, the display unit 10 and the support unit 20 can be easily bent by gravity. To address this matter, the display unit 10 and the support unit 20 can be formed to have a large thickness in their bottom edge portion and gradually decreasing thickness as they go to their top edge portions. In this case, gravities being applied to the top edge portions of the display unit 10 and the support unit 20 are smaller than those being applied to the bottom edge portions of the display unit 10 and the support unit 20. As such, the display unit 10 and the support unit 20 are hardly bent.

As shown in FIG. 2, the display unit 10 has a large thickness D1 at its bottom edge portion adjacent to the driving unit 40. Also, the display unit 10 has the gradually decreasing thickness D2 in the direction away from the driving unit 40. The first thickness D1 is larger than the second thickness D2.

Similarly, the support unit 20 has a large thickness D3 at its bottom edge portion adjacent to the driving unit 40. Also, the support unit 20 has the gradually decreasing thickness D4 as in the direction away from the driving unit 40. The third thickness D3 is larger than the fourth thickness D4.

In this manner, the display unit 10 and the support unit 20 are formed thicker in their bottom edge portions rather than their top edge portions. As such, the display unit 10 and the support unit 20 can be hardly bent toward one side of themselves by gravity. Therefore, the flexible display device with a flattened structure can be realized.

When the display unit 10 and the support unit 20 are formed to have gradually decreasing thickness in the upward direction, a difference between a maximum thickness and a minimum thickness of the display unit 10 and the support unit 20 preferably is below 40% of the minimum thickness. If the difference between the maximum thickness and the minimum thickness is larger than 40% of the minimum thickness, the bottom edge portions of the display unit 10 and the support unit 20 become very thick. Due to this, the display unit 10 and the support unit 20 cannot be smoothly rolled in.

The connection unit 30 is used to attach together one edge of the display unit 10 and one edge of the support unit 20. In detail, top edges of the display unit 10 and the support unit 20 are fastened to each other by the connection unit 30 in such a manner as to come in contact with each other. In other words, the top edges of the display unit 10 and the support unit 20 can be connected to each other.

To this end, grooves G parallel to the connection unit 30 can be formed along the edges of the display unit 10 and the support unit 20 as shown in FIG. 1. The grooves G receive engagement protrusions 30a of the connection unit 30 and enable the top edges of the display unit 10 and the support unit 20 to be in contact with each other.

In order to bring the display unit 10 into close contact with the support unit 20, the connection unit 30 can be supported by side walls which downwardly extend from both edge of a flattened upper surface H and each include an inclined outer surface S. The inclined outer surfaces S of the side walls are symmetrical with respect to the engagement protrusions 30a and progress from both the edges of the flattened upper surface H in downward and inward directions. In accordance therewith, the display unit 10 and the support unit 20 can closely contact each other.

In this way, one edge of the display unit 10 and one edge of the support unit 20 can be connected by the connection unit 30. As such, the display unit 10 and the support unit 20 can be simultaneously ejected without being separated from each other when the display unit 10 and the support unit 20 are rolled out.

The driving unit 40 is used to control operations of the display unit 10 and the support unit 20. To this end, the driving unit 40 is connected to the other edges of the display unit 10 and the support unit 20 opposite to the edges of the display unit 10 and the support unit 20 which are combined with the connection unit 30. Also, the driving unit 40 performs a plurality of operation necessary to roll in and roll-out the display unit 10 and the support unit 20.

The plurality of operations includes a first operation allowing the display unit 10 and the support unit 20 to come in contact with each other. In detail, the first operation allows a back surface of the display unit 10 and a back surface of the support unit 20 to contact each other with gradually increasing their surface contact area under control of the driving unit 40. Such a first operation bringing the display unit 10 and the support unit 20 into contact with each other is performed when the display unit 10 and the support unit 20 is unrolled (i.e., rolled out). As such, the display unit 10 can easily maintain a flattened state. This results from the fact that the display unit 10 and the support unit 20 have restoring forces acting in directions opposite to each other. In other words, the display unit 10 and the support unit 20 being in contact with each other by the first operation can offset the restoring forces. As such, substantially equal forces are applied to the display unit 10 and the support unit 20. In accordance therewith, the display unit 10 can maintain the relatively flattened state until another operation instead of the first operation is performed by the driving unit 40.

Also, the plurality of operations includes a second operation enabling the display unit 10 and the support unit 20 to be separated from each other. When the second operation is performed, the back surface of the display unit 10 and the back surface of the support unit 20 can be separated from each other with gradually decreasing their surface contact area under control of the driving unit 40. Such a second operation is formed when the display unit 10 and the support unit 20 is rolled (i.e., rolled in). In other words, the second operation enables the display unit 10 and the support unit 20 to be separated from each other for stowage.

Also, the driving unit 40 can include a plurality of driving means. For example, the driving unit 40 can include a first driving means and a second driving means. The first driving means can be connected to the display unit 10 and configured to control operations of the display unit 10. The second driving means can be connected to the support unit and configured to control operations of the support unit 20. In detail, the first driving means can roll or unroll the display unit 10 and the second driving means can roll and unroll the support unit 20.

The plurality of driving means is preferably configured in such a manner as to be organically connected to one another and simultaneously driven. More preferably, the plurality of driving means is simultaneously driven in a mode allowing a direction of the restoring force of the display unit 10 to be countered against another direction of the restoring force of the support unit 20, in order to offset the restoring forces of the display unit 10 and the support unit 20. For example, the first driving means and the second driving means can be configured to rotate along rotation directions opposite to each other during the first operation (i.e., the roll out operation) or the second operation (i.e., the roll in operation).

In accordance therewith, if the display unit 10 and the support unit 20 are unrolled by the first driving means and the second driving means, the display unit 10 and the support unit 20 come in contact with each other and are rolled out. Also, when the display unit 10 and the support unit 20 are rolled by the first driving means and the second driving means, the display unit 10 and the support unit 20 are separated from each other and rolled in until reaching the connection unit 30.

The plurality of driving means having the above-mentioned configuration can offset the restoring forces of the display unit 10 and the support unit 20 when the display unit 10 and the support unit 20 are rolled out. As such, a flattened flexible display device can be realized.

The driving means according to the present disclosure can be implemented in a variety of configurations. The flexible display devices adopting the variety of driving means are shown in FIGS. 3 through 8B.

Figure 3:
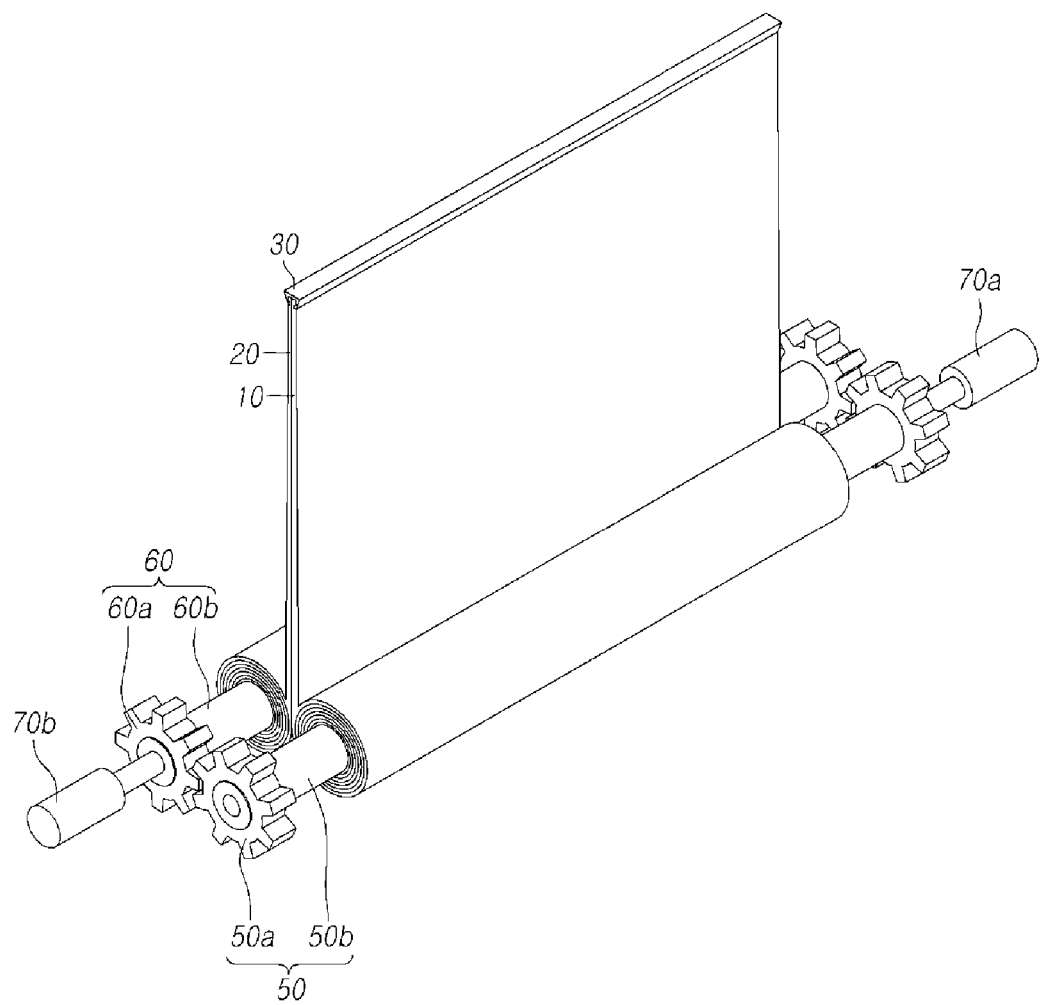
FIG. 3 is a perspective view showing a flexible display device which adopts a driving means according to an embodiment of the present disclosure.
Figure 4A:
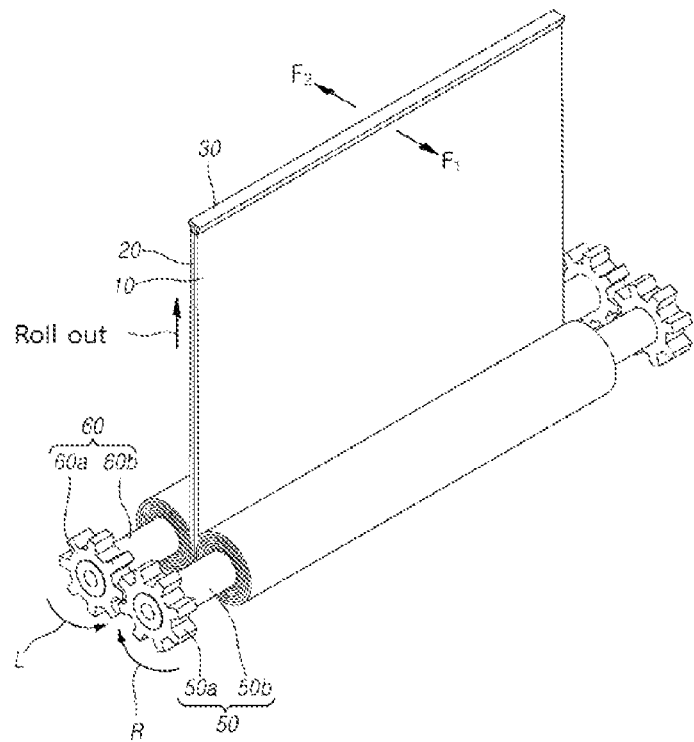
FIGS. 4A and 4B are perspective views showing roll-out and roll in states of the flexible display device of FIG. 3.
Figure 4B:
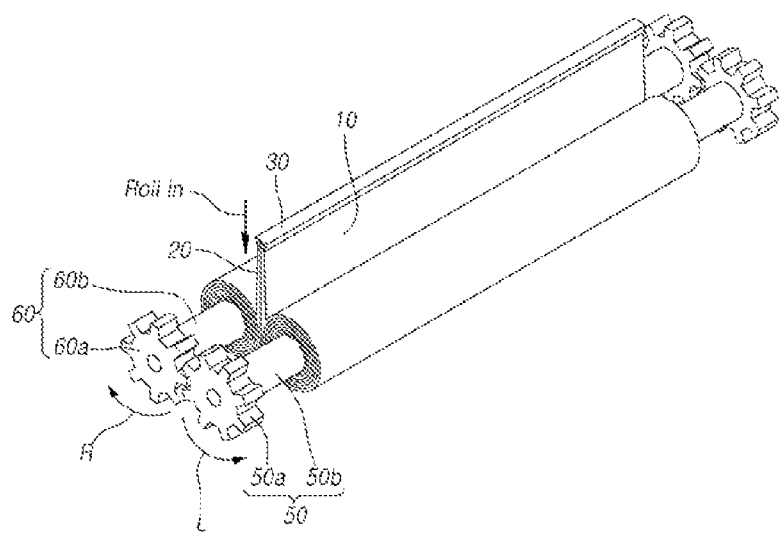

Referring to FIGS. 3, 4A and 4B, the flexible display device according to the present disclosure can include a first driving means 50 configured to roll or unroll the display unit 10 and a second driving means 60 configured to roll or unroll the support unit 20. As needed, the flexible display device can further include a first motor 70a configured to apply a rotation force to the first driving means 50 and a second motor 70b configured to apply a rotation force to the second driving means 60.

The display unit 10 is disposed onto the first driving means 50 in a rolled state. The first driving means 50 includes a first driving shaft 50b and first gears disposed at both ends of the first driving shaft 50b.

The support unit 20 is disposed onto the second driving means 60 in a rolled state. The second driving means 60 includes a second driving shaft 60b and second gears disposed at both ends of the second driving shaft 60b.

As shown in FIG. 3, the first gears 50a of the first driving means 50 are disposed adjacently to the second gears 60a of the second driving means 60. The first gears 50a and the second gears 60a can be rotatably engaged with each other.

As such, when one of the first gears 50a of the first driving means 50 and one of the second gears 60a of the second driving means 60 rotates, the first driving shaft 50b and the second driving shaft 60b rotate together.

The first motor 70a is connected to one end of the first driving shaft 50b. As such, the first motor 70a can apply the rotation force to the first gears 50a and the first driving shaft 50b. Similarly, the second motor 70b is connected to one end of the second driving shaft 60b. As such, the second motor 70b can apply the rotation force to the second gears 60a and the second driving shaft 60b.

Although the first motor 70a and the second motor 70b are connected to the first driving shaft 50b and the second driving shaft 60b as shown in FIG. 3, only a single motor can be disposed at one of the first driving shaft 50b and the second driving shaft 60b. This results from the fact that the first gears 50a and the second gears 60a are fixedly disposed at the first driving shaft 50b and the second driving shaft 60b and rotatably engaged with each other. In other words, if one of the first driving shaft 50b and the second driving shaft 60b rotates along one direction, the other one also rotates along the other one direction. In accordance therewith, the display unit 10 and the support unit 20 can be simultaneously rolled onto or unrolled from the first driving shaft 50*b* and the second driving shaft 60*b*.

The display unit 10 and the support unit 20 each have flexibility. As such, the display unit 10 and the support unit 20 can be wound several dozens of times onto the first driving shaft 50*b* and the second driving shaft 60*b* as shown in FIG. 3.

The end edge areas of the display unit 10 and the support unit 20 rolled on the driving shafts 50*b* and 60*b* are in physical contact with each other by means of the connection unit 30.

The end edges of the display unit 10 and the support unit 20 being in contact with each other by the connection unit 30 are parallel to the first driving shaft 50*b* and the second driving shaft 60*b*. The connection unit 30 is disposed between the first driving shaft 50*b* and the second driving shaft 60*b*.

As such, the display unit 10 rolled onto the first driving shaft 50*b* and the support unit 20 rolled onto the second driving shaft 60*b* are unrolled in the state that only their end edges come in contact with each other by the connection unit 30, and are evenly raised in an upward direction with increasing their contact area. In other words, the display unit 10 and the support unit 20 rolled onto the first and second driving shafts 50*b* and 60*b* can be evenly rolled out with contacting each other.

FIG. 4A is a perspective view showing a roll-out state of the flexible display device of FIG. 3. FIG. 4B is a perspective view showing a roll-in state of the flexible display device of FIG. 3.

For the convenience of explanation, FIGS. 4A and 4B simply show the configuration of the driving unit shown in FIG. 3. As such, the rotation of the driving means indicates the rotation of the driving shaft or the gear included in the driving means as described in FIG. 3.

Referring to FIG. 4A, the display unit 10 and the support unit 20 disposed on the first driving means 50 and the second driving means 60 in the rolled state can be unrolled by rotating the driving shafts included in the first driving means 50 and the second driving means 60. In other words, the roll-out operation of the display unit 10 and the support unit 20 can be performed as shown in FIG. 4A.

In detail, the roll-out operation allows the first gears 50*a* of the first driving means 50 to rotate in a first direction (a clockwise direction or a right hand rotation direction) R. As such, the display unit 10 rolled onto the first driving shaft 50*b* is unrolled.

At the same time, the second gears 60*a* rotates in a second direction (a counter-clockwise direction or a left hand rotation direction) L because the first gears 50*a* is engaged with the second gears 60*a*. In accordance therewith, the support unit 20 rolled onto the second driving shaft 60*b* is unrolled.

As the above-mentioned roll-out operation is performed, the display device 10 being unrolled from the first driving shaft 50*b* generates one restoring force F1 bending the display unit 10 in one side direction (i.e., an exposed surface direction thereof). As the same time, the support unit 20 being unrolled from the second driving shaft 60*b* also generates another restoring force F2 bending the support unit 20 in the other side surface direction (an exposed surface direction thereof). The restoring forces F1 and F2 of the display device 10 and the support unit 20 are offset against each other.

In this manner, the restoring forces affecting the display unit 10 and the support unit 20 are offset to each other, the display unit 10 and the support unit 20 do not bend in any surface direction. In accordance therewith, a flattened display unit 10 can be realized.

Also, the top edges of the display unit 10 and the support unit 20 are fastened with contacting each other by the connection unit 30. As such, the display unit 10 and the support unit 20 rising or being rolled-out along the upward direction can be in surface contact with each other.

Referring to FIG. 4B, the unrolled display unit 10 and the unrolled support unit 20 are rolled onto the first and second driving means 50 and 60 by rotating the driving shafts included in the first driving means 50 and the second driving means 60 in directions opposite to the rotation directions at the roll-out of the display unit 10 and the support unit 20. In other words, a roll-in operation of the display unit 10 and the support unit 20 can be performed as shown in FIG. 4B.

In detail, the roll-in operation enables the first gears 50*a* of the first driving means 50 to rotate in the second direction L. As such, the display unit 10 is rolled onto the first driving shaft 50*b*.

At the same time, the second gears 60*a* rotate in the first direction R because the second gears 60*a* are engaged with the first gears 50*a*. As such, the support unit 20 is rolled onto the second driving shaft 60*b*.

Also, the display unit 10 and the support unit 20 unrolled in the contact state are separated from each other until the area fastened by the connection unit 30, as they are rolled onto the first driving shaft 50*b* and the second driving shaft 60*b*.

As shown in FIG. 4A, one force F1 bending the display unit 10, which is unrolled by the first driving means 50, in one surface direction is offset by the other force F2 bending the support unit 20, which is unrolled by the second driving means 60. In accordance therewith, the flattened display unit 10 being raised in the vertical direction can be realized. In view of this point, the display unit 10 and the support unit 20 preferably have similar weights.

In order to enhance a contact property of the display unit 10 and the support unit 20, magnetic films can be attached to the display unit 10 and the support unit 20. Alternatively, the display unit 10 and the support unit 20 can be magnetically treated. In this case, the magnetically treated display device 10 using an organic light emitting diode panel can be realized by including a magnetic material into a capping layer (or a sealing layer).

Also, when the support unit 20 is a display panel like the display unit 10, either magnetic films can be attached on edges of the display unit 10 and the support unit 20 or the edges of the display unit 10 and the support unit 20 can be magnetically treated.

Figure 5:
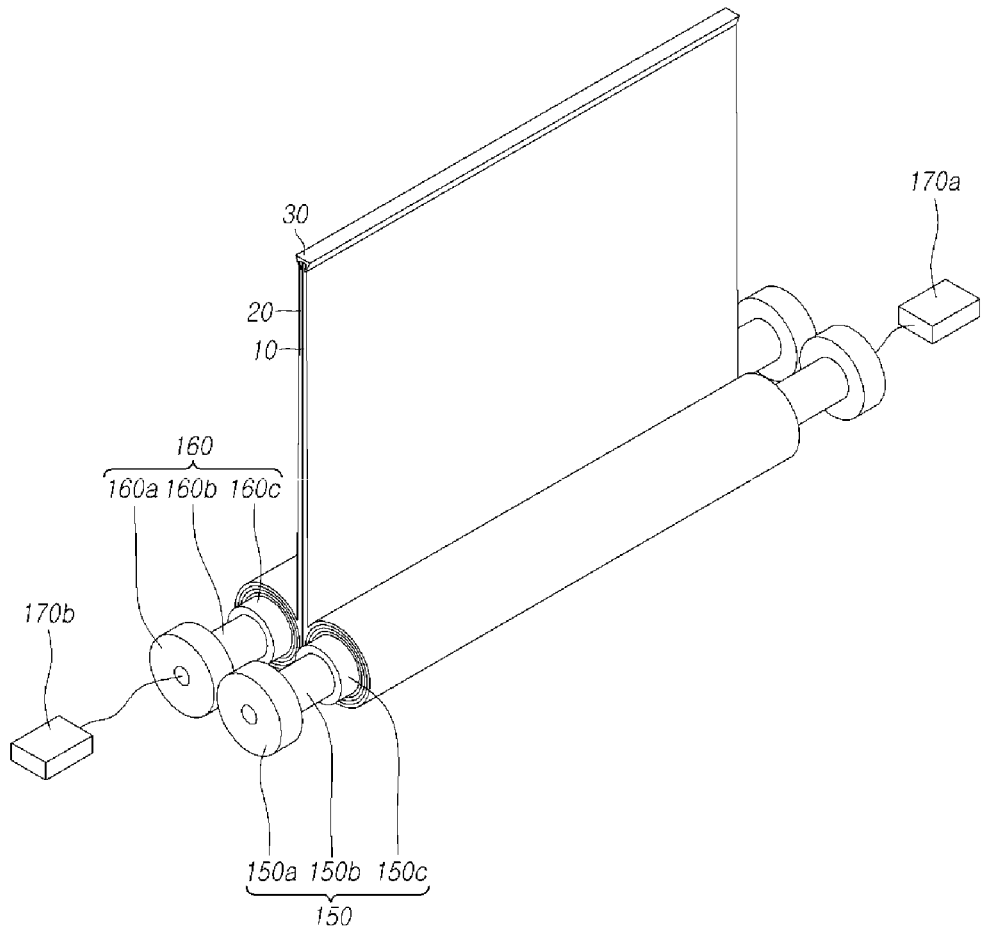
FIG. 5 is a perspective view showing a flexible display device which adopts a driving means according to another embodiment of the present disclosure.
Figure 6:
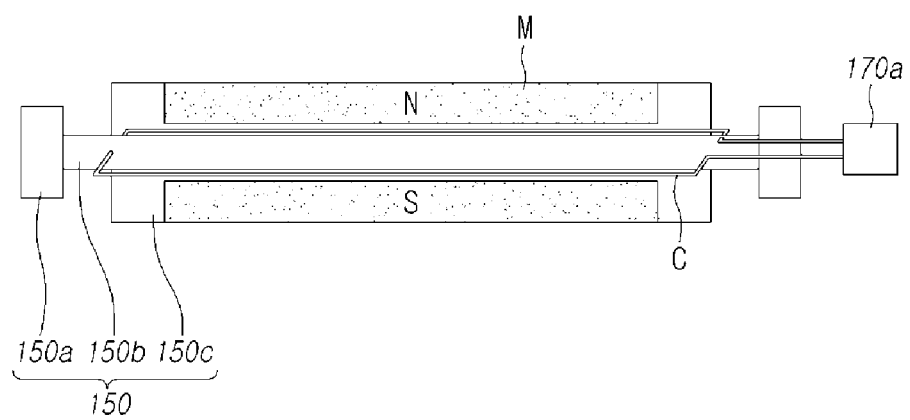
FIG. 6 is a cross-sectional view showing the structure of the driving means of FIG. 5.

FIGS. 5 and 6 show a flexible display device which adopts a driving unit according to another embodiment of the present disclosure. The flexible display device shown in FIGS. 5 and 6 has the same configuration as that shown in FIGS. 1 and 2 with the exception of some components. As such, components of this flexible display device having the same structure and function as those of the previously described flexible display device will be referred to by the same reference numbers and names. Also, the description of this flexible display device overlapping with the previous described flexible display device will be omitted.

Referring to FIGS. 5 and 6, the flexible display device according to the present disclosure includes a display unit 10 and a support unit 20 configured to support the display device 10. Also, the flexible display device includes a first driving means 150 configured to roll or unroll the display unit 10 and a second driving means 160 configured to roll or unroll the support unit 20.

The first driving means 150, onto which the display unit 10 is disposed in a rolled state, includes a first driving shaft 150b, first fixation members 150a disposed both ends of the first driving shaft 150b, and a first rotating body 150c rotatably wound (or disposed) round the first driving shaft 150b.

The first driving shaft 150b and the first rotating body 150c included in the driving means 150 can implement a built-in motor, as shown in FIG. 6. The first rotating body 150c can be formed in a cylinder shape with a larger inner diameter than the diameter of the first driving shaft 150b. As such, the first rotating body 150c is penetrated by the first driving shaft 150b in such a manner as to be disposed between the first fixation members 150a which are used to fasten both ends of the first driving shaft 150b.

Also, magnets M are arranged onto the first rotating body 150c. As such, the first rotating body 150c has a magnetic property. Meanwhile, multi-turn coils C can be attached onto the first driving shaft 150b which penetrates through the first rotating body 150c. The coils C are connected to a first power supply 170a. The first power supply 170a can apply a direct current power (or voltage) to the coils C.

The coil C can be wound onto the first driving shaft 150b along an axis direction of the first driving shaft 150b running parallel to the first rotating body 150c. Alternatively, the coil C can be wound onto a part area of the first driving shaft 150b corresponding to the length of the first rotating body 150c along the cylindrical surface of the first driving shaft 150b.

Such a first driving shaft 150b including the wound coils C cannot rotate because it is in a fixed state by the first fixation members 150a. Meanwhile, the first rotating body 150c formed in the cylindrical shape can rotate. As such, the display unit 10 can be rolled in or rolled out by being rolled onto or unrolled from the first rotating body 150c.

The second driving means 160, onto which the support unit 20 is disposed in a rolled state, includes a second driving shaft 160b, second fixation members 160a disposed both ends of the second driving shaft 160b, and a second rotating body 160c rotatably wound (or disposed) round the second driving shaft 160b. Also, multi-turn coils C attach onto the second driving shaft 160b and connected to a second power supply 170b are included in the second driving means 160, even though they are not shown in the drawings.

Such a second driving means 160 is configured with components having the same structures as those of the first driving means 150. As such, the support unit 20 can be rolled in or rolled out by being rolled onto or unrolled from the second rotating body 160c.

The flexible display device including the above-mentioned driving unit allows the display unit 10 to be rolled out or rolled out as follows.

The first fixation members 150a of the first driving means 150 and the second fixation members 160a of the second driving means 160 are disposed in such a manner as to be in contact with each other. The display unit 10 is disposed onto the first rotating body 150c of the first driving means 150 in a rolled state. Similarly, the support unit 20 is also disposed onto the second rotating body 160c of the second driving means 160 in a rolled state.

The first power supply 170a applies a power to the first driving shaft 150b. The second power supply 170b applies another power to the second driving shaft 160b.

When the powers are applied to the first driving shaft 150b and the second driving shaft 160b, the first rotating body 150c and the second rotating body 160c disposed to wrap the fixed first driving shaft 150b and the fixed second driving shaft 160b rotate in directions that are opposite to each other. As such, one of the roll in and roll-out operations of the display unit 10 and the support unit 20 can be performed. At the same time, one of contact and separation operations of the display unit 10 and the support unit 20 is performed. Such operations of the display unit 10 and the support unit 20 are the same as those described in FIGS. 4A and 4B.

In the driving unit with the above-mentioned configuration, the driving shaft and the rotating body can implement a built-in motor. As such, it is not necessary for a separated motor. In accordance therewith, the flexible display device can be light-weighted and/or small-sized.

Figure 7:
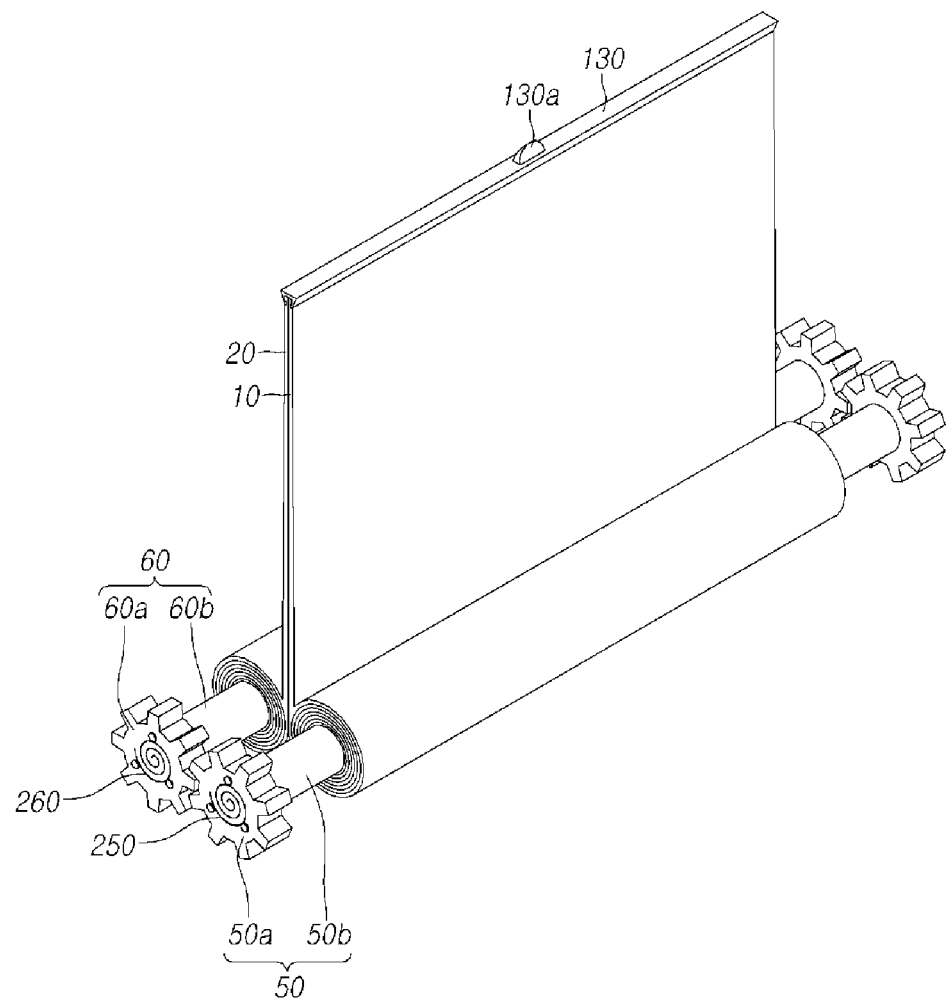
FIG. 7 is a perspective view showing a flexible display device which adopts a driving means according to still another embodiment of the present disclosure.
Figure 8A:
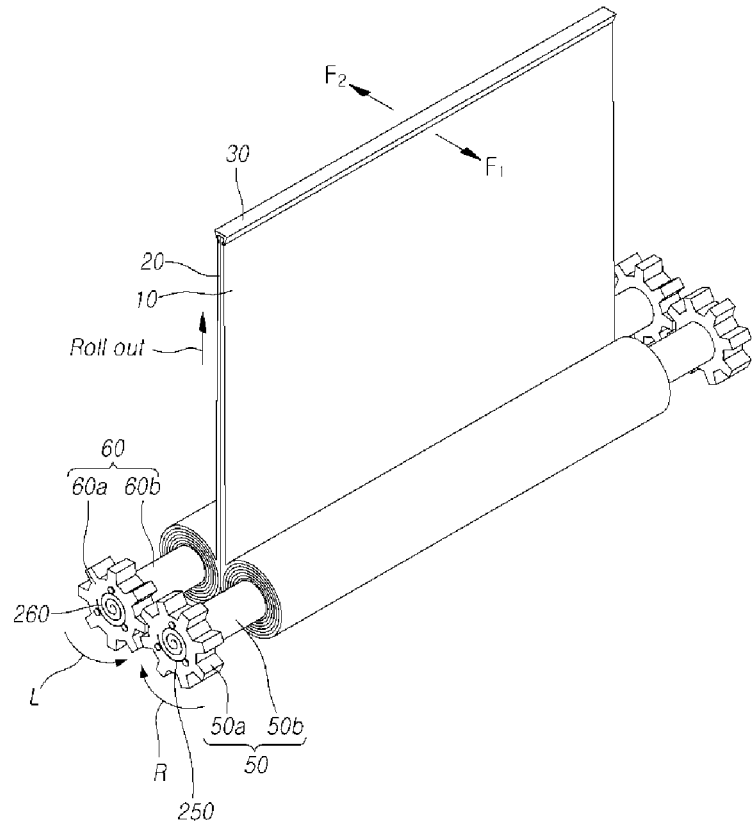
FIGS. 8A and 8B are perspective views showing roll-out and roll in states of the flexible display device of FIG. 7.
Figure 8B:
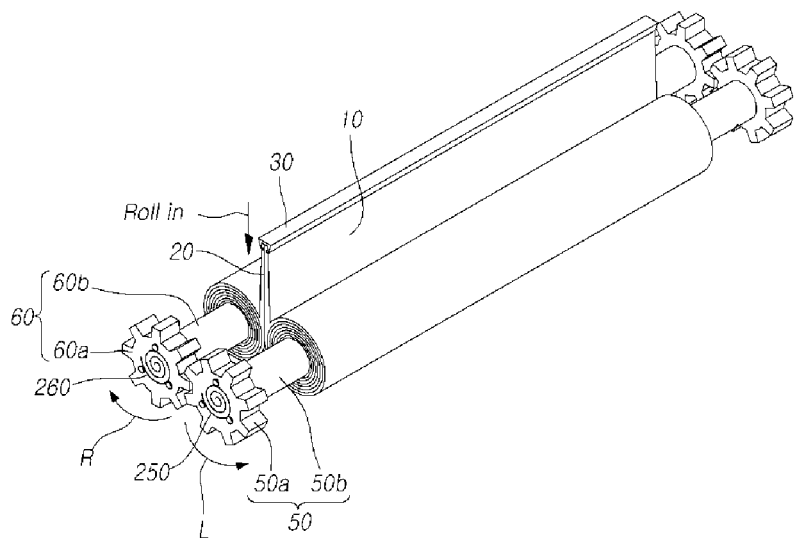

FIG. 7 is a perspective view showing a flexible display device which adopts still another embodiment of the present disclosure. FIGS. 8A and 8B are perspective views showing roll-out and roll in states of the flexible display device of FIG. 7. The flexible display device shown in FIG. 7 has the same configuration as that shown in FIGS. 1 and 2 with the exception of some components. As such, components of this flexible display device having the same structure and function as those of the previously described flexible display device will be referred to by the same reference numbers and names. Also, the description of this flexible display device overlapping with the previous described flexible display device will be omitted.

Referring to FIGS. 7, 8A and 8B, the flexible display device according to the present disclosure includes a display device 10, a support unit 20 configured to support the display unit 10, a first driving means 50 configured to roll or unroll the display unit 10 and a second driving means 60 configured to roll or unroll the support unit 20. Also, the flexible display device includes a first elastic element 250 configured to apply a rotation force to the first driving means 50 and a second elastic element 260 configured to apply another rotation force to the second driving means 60.

The display unit 10 is disposed onto the first driving means 50 in a rolled state. The first driving means 50 includes a first driving shaft 50b and first gears disposed at both ends of the first driving shaft 50b.

The support unit 20 is disposed onto the second driving means 60 in a rolled state. The second driving means 60 includes a second driving shaft 60b and second gears disposed at both ends of the second driving shaft 60b.

The first gears 50a and the second gears 60a are rotatably engaged with each other. The first elastic element 250 is disposed in one of the first gears 50a. The second elastic element 260 is disposed in one of the second gears 60a.

Such a first elastic element 250 can apply an elastic restoring force to the first driving shaft 50b. Similarly, the second elastic element 260 can apply another elastic restoring force to the second driving shaft 60b.

One end of the display unit 10 and the support unit 20 are physically contacted with each other by a connection unit 130. The connection unit 130 includes a handle 130a being in physical contact with a user. As the handle 130a is physically touched by the user, the display unit 10 and the support unit 20 can be rolled in or rolled out.

In other words, the display unit 10 and the support unit 20, which are disposed onto the first driving means 50 and the second driving means 60 in the rolled state, is unrolled and rolled out by a physical force applied from a user.

In detail, a force pulling the handle 130a, which is formed in the connection unit 130, in an upward direction is transferred to the first driving means 50 and the second driving means 60 as a rotation force. As such, the display unit 10 and the support unit 20 is rolled out.

Meanwhile, the first elastic element 250 and the second elastic element 260, which are disposed in the first driving means 50 and the second driving means 60, apply the elastic restoring forces to the first driving shaft 50b and the second driving shaft 60b. As such, the rolled-out display unit 10 and the rolled-out support unit 20 can be rolled in.

In this way, the driving unit including the handle 130a and the first and second elastic elements can be applied to the flexible display device. The flexible display device can roll in or roll out the display unit 10 using only the physical force of a user without any separated motor.

Figure 9:
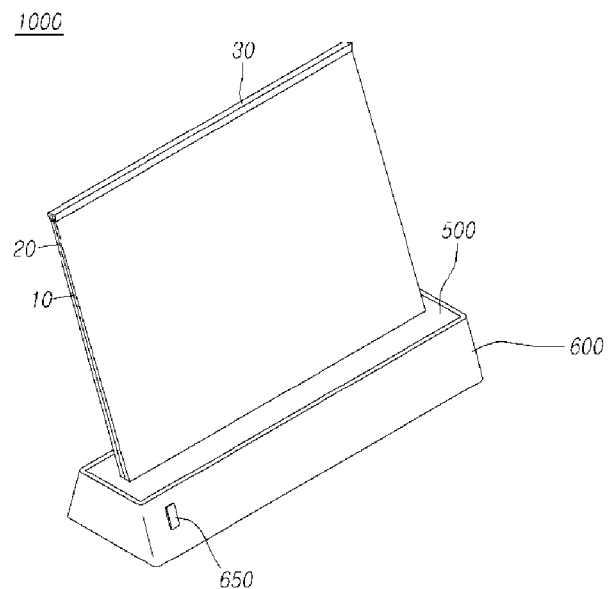
FIG. 9 is a perspective view showing a flexible display device according to a second embodiment of the present disclosure.
Figure 10:
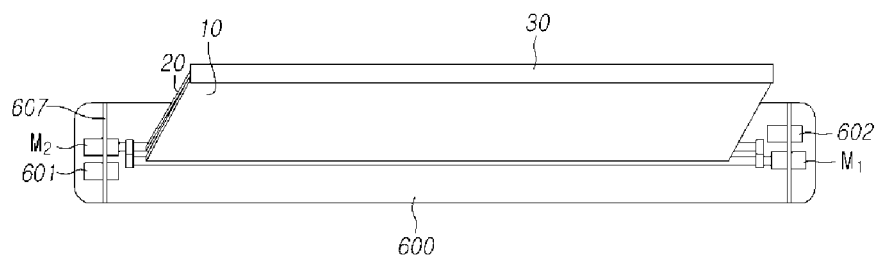
FIG. 10 is a view showing the arrangement structure of a display portion of the flexible display device according to a second embodiment of the present disclosure.
Figure 11A:
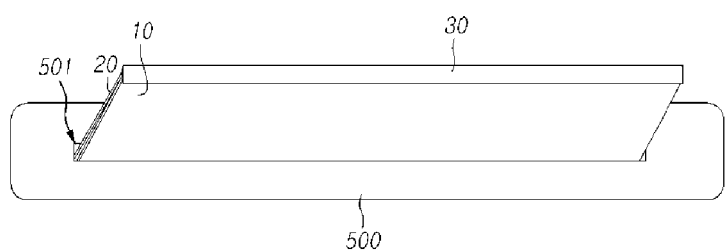
FIGS. 11A through 11C are views showing the combinative structure of a cover portion and a display portion of the flexible display device according to a second embodiment of the present disclosure.
Figure 11B:
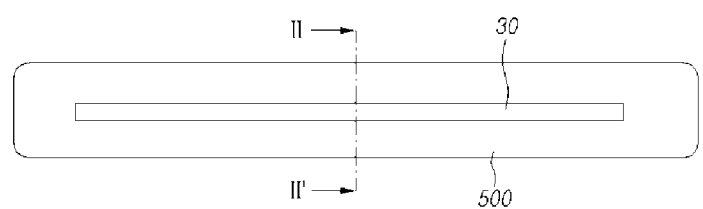
Figure 11C:
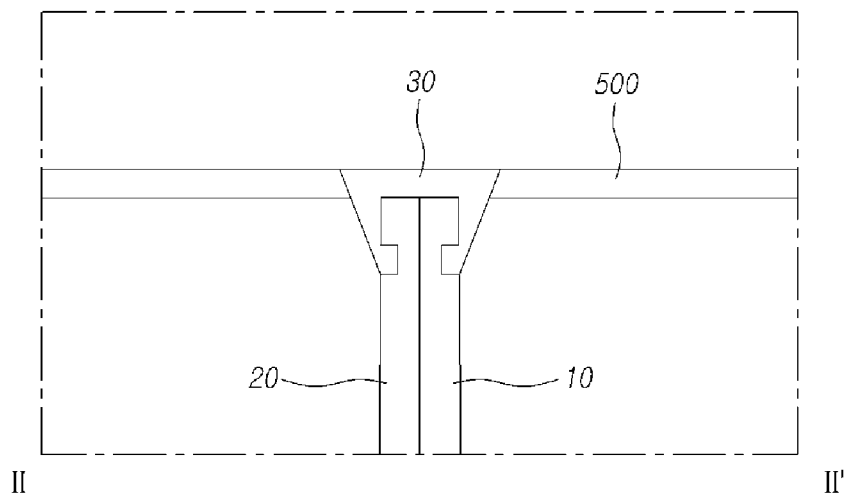

FIG. 9 is a perspective view showing a flexible display device according to a second embodiment of the present disclosure. FIG. 10 is a schematic view showing the arrangement structure of a display unit of the flexible display device according to a second embodiment of the present disclosure. FIGS. 11A through 11C are views showing the combinative structure of a display unit with a cover in the flexible display device according to a second embodiment of the present disclosure.

The flexible display device according to a second embodiment of the present disclosure has the same configuration as that of the first embodiment with the exception of further including a housing configured to receive the display unit and the support unit. As such, components of the second embodiment having the same structure and function as those of the first embodiment will be referred to by the same reference numbers and names. Also, the description of the second embodiment overlapping with the first embodiment described in FIGS. 1 and 2 will be omitted.

Referring to FIG. 9, the flexible display device 1000 according to the present disclosure includes a housing 600 configured to include a display unit 10, a support unit 20, a connection unit 30 and a driving unit 40. The housing 600 includes a cover 500 configured to cover an opened upper surface of the housing 600.

The cover 500 can be formed in a single body united with the housing 600. In this case, the housing 600 can be formed to have a separated bottom surface (not shown). As such, the display unit 10, the components of the flexible display device 1000 can be mounted on the bottom surface and then received into the housing 600 along a bottom surface direction of the housing 600.

Also, the flexible display device includes a driving board 602 and a power supply 601 which are disposed within the housing 600 which receives the components of the flexible display device. The driving board 602 is connected to a FPC (flexible printed circuit) board which is attached to the display unit 10. The power supply 601 is configured to apply a power to the motors M1 and M2.

As shown in FIG. 11A, an opening 501 is formed in the cover 500. As such, the display unit 10 and the support unit 20 are rolled in into the housing 600 or rolled out from the housing 600.

In other words, during one of the roll-out or roll-in operations described in FIGS. 4A and 4B, the display unit 10 and the support unit 20 of the flexible display device are rolled out along an upward direction with respect to the cover 500 or rolled in along a downward direction with respect to the cover 500.

If the driving unit included in the flexible display device 1000 is an automatic driving unit shown FIGS. 3 and 5, one of the roll-in or roll-out operations of the display unit 10 can be performed by touching a button 650 which is disposed on a front surface of the housing 600. Alternatively, when the flexible display device 1000 includes a manipulative (or passive) driving unit shown in FIG. 7, the display unit 10 can be rolled out by pulling the handle, which is formed on an upper surface of the connection unit 30 used to connect the top edges of the display unit 10 with the support unit 20, in an upward direction.

With the exception of the display unit 10 and the support unit 20 which are rolled in or rolled out, the motors M1 and M2, the power supply 601 and the driving board 602 can be fastened by movement prevention members 607. As an example of the movement prevention member 607, an engagement element, such as a screw or an adhesive tape, combinable with the housing 600 can be used.

Also, the display unit 10 and the support unit 20 can be positioned within the housing 600 of the flexible display device 1000 by being rolled in into the housing 600. At this time, the upper surface of the connection unit 30 disposed in the top edges of the display unit 10 and the support unit 20 can become the same plane as that of the cover 500 as shown in FIGS. 11B and 11C.

Moreover, the combinative structure of the connection unit 30 with the display unit 10 and the support unit 20 is the same as that shown in FIGS. 1 and 2.

Figure 12:
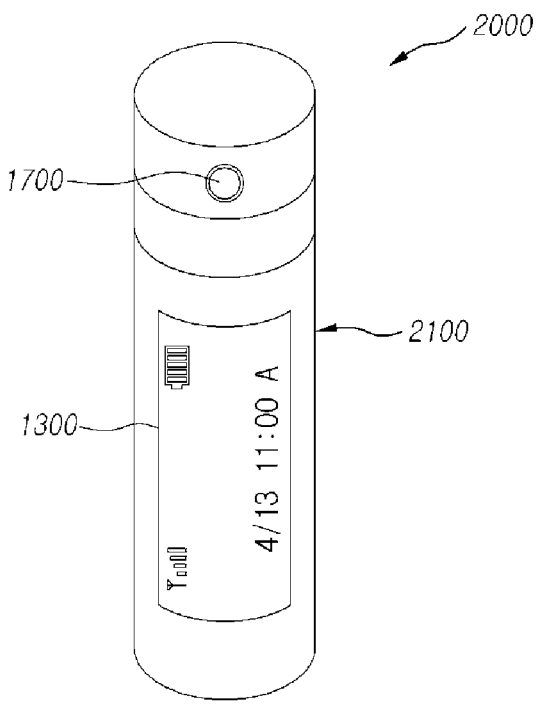
FIGS. 12 and 13 are perspective views showing a flexible display device according to a third embodiment of the present disclosure.
Figure 13:
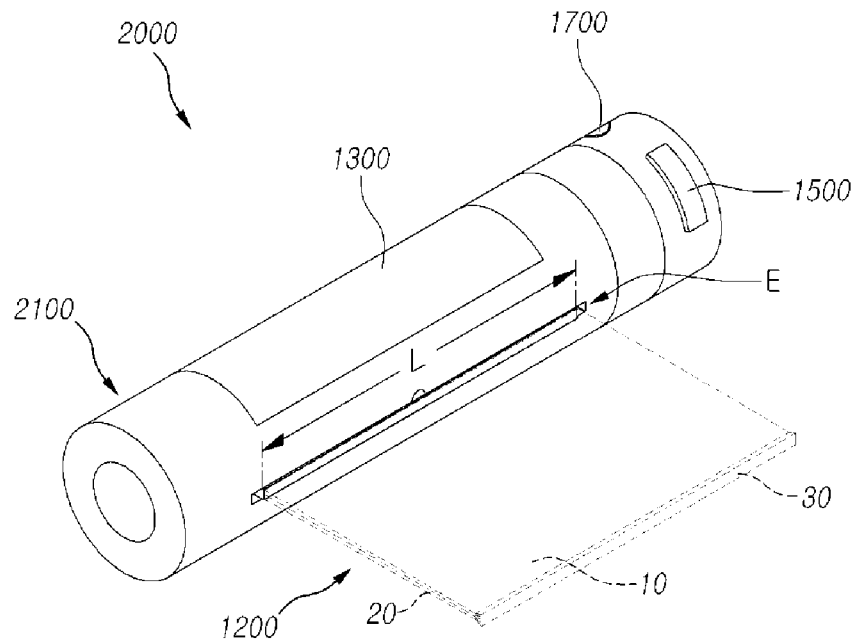
Figure 14:
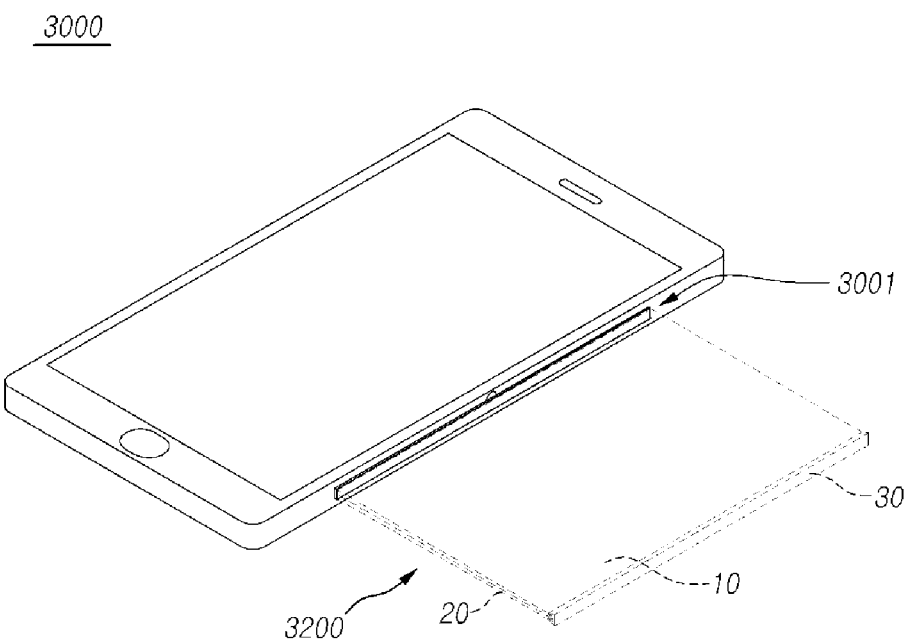
FIG. 14 is a perspective view showing a flexible display device according to a fourth embodiment of the present disclosure.

FIGS. 12 and 13 are perspective views showing a flexible display device according to a third embodiment of the present disclosure. FIG. 14 is a perspective view showing a flexible display device according to a fourth embodiment of the present disclosure.

The third and fourth embodiments relate to flexible display devices of the present disclosure which are applied to portable terminals.

Referring to FIGS. 12 and 13, the flexible display device according to a third embodiment of the present disclosure is applied to a cylindrical terminal 2000.

The cylindrical terminal 2000 adopting the third embodiment of the present disclosure includes a housing 2100, in which an opening gap E is formed, and a flexible display device 1200 rolled into or rolled out from the housing 2100 through the opening gap E.

The housing 2100 is formed in a cylindrical shape. Also, the housing 2100 can include a display window 1300, a key pad 1500 and a camera 1700. The opening gap E is formed in the cylindrical surface of the housing 2100 along an axis of the housing 2100. Also, the opening gap E can be formed to have a longer length than the width of the flexible display device 1200.

The display window 1300 is used to display states of the cylindrical terminal 2000. For example, receiving sensitivity, battery status, current time and so on can be displayed on the display window 1300. When the key pad 1500 is manipulated, the flexible display device 1200 can be rolled into the housing 2100 or rolled out from the housing 2100.

Referring to FIG. 14, the flexible display device according to a fourth embodiment of the present disclosure is applied to a smart phone 3000.

The smart phone 3000 adopting the fourth embodiment of the present disclosure includes an opening gap 3001 formed in one side surface. A display unit 10 of a flexible display device 3200 can go in and out through the opening gap 3001. The display unit 10 is supported by a support unit 20. A connection unit is combined with one edge of the display unit 10 and the support unit 20. As such, the display unit 10 and the support unit 20 can come in surface contact with each other.

If the display unit 10 includes a transparent display panel and the support unit 20 is formed from a transparent material, augmented reality can be realized.

For example, when an object is photographed by a camera attached to the smart phone 3000, the photographed object can be displayed on the flexible display device 3200. If the object photographed by the camera is a building, the name, address and so on for the photographed building can also be displayed on the display unit 10 of the flexible display device 3200. Moreover, when the object photographed by the camera is a product, the information including advertisement, specifications and so on for the product can be displayed on the display unit 10 of the flexible display device 3200.

A button on the smart phone 3000 or a touch button on a display window of the smart phone 3000 is selected by a user. As such, the flexible display device 3200 can go in or out.

As described above, the flexible display devices according to the present disclosure can allow the display unit disposed within the housing in the rolled state to maintain a relatively flattened state at the use of the display unit.

Also, the flexible display devices according to the present disclosure can enable the display unit to be in close contact with the support unit when the display unit disposed within the housing in the rolled state is externally ejected. In accordance therewith, the ejected display unit can maintain a rigidly flattened state.

Also, although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. More particularly, various variations and modifications are possible in the component parts which are described in the embodiments. Accordingly, the scope of the present disclosure shall be determined only by the appended claims and their equivalents without being limited to the detailed description.

What is claimed is:

1. A flexible display device comprising:
    a display unit;
    a support unit configured to selectively support the display unit;
    a first shaft, wherein the display unit is configured to be rolled onto or unrolled from the first shaft;
    a second shaft, wherein the support unit is configured to be rolled onto or unrolled from the second shaft;
    a connection unit configured to attached together one edge of the display unit and one edge of the support unit; and
    a driving unit connected to another edge of the display unit and another edge of the support unit and configured to control a plurality of operations,
    the plurality of operations includes a first operation which allows the display unit and the support unit to come in contact with each other to maintain a relatively flattened state of the display unit, the display unit being unrolled from the first shaft and the support unit being unrolled from the second shaft during the first operation, and a second operation which enables the display unit and the support unit to be separated from each other for stowage, the display unit being rolled onto the first shaft and the support unit being rolled onto the second shaft during the second operation, wherein the driving unit includes:
    a first driving means configured to drive the display unit and a second driving means configured to drive the support unit, and
    the first driving means rotates in a first direction and the second driving means rotates in a second direction opposite to the first direction during the first operation, and the first driving means rotates in the second direction and the second driving means rotates in the first direction during the second operation.

2. The flexible display device of claim 1, wherein
    the first operation allows a back surface of the display unit and a back surface of the support unit to come in contact with each other with gradually increasing a surface contact area under control of the driving unit, and
    the second operation enables the back surface of the display unit and the back surface of the support unit to be separated from each other with gradually decreasing the surface contact area under control of the driving unit.

3. The flexible display device of claim 1, wherein the first driving means and the second driving means are configured to be simultaneously driven.

4. The flexible display device of claim 1, wherein
    the first driving means includes a first driving shaft onto which multi-turn coils are attached, first fixation members are disposed at both ends of the first driving shaft, and a first rotating body is configured to wrap the first driving shaft and have a magnetic property; and
    the second driving means includes a second driving shaft onto which multi-turn coils are attached, second fixation members are disposed at both ends of the second driving shaft, and a second rotating body is configured to wrap the second driving shaft and have a magnetic property.

5. The flexible display device of claim 4, wherein
    the first driving shaft and the second driving shaft are in a fixed state, and
    the first rotating body and the second rotating body roll or unroll the display unit and the support unit by rotating along rotation directions opposite to each other.

6. The flexible display device of claim 1, wherein
    the display unit and the support unit are rolled out for usage under control of the driving unit at the first operation, and
    the display unit and the support unit are rolled in for stowage under control of the driving unit at the second operation.

7. The flexible display device of claim 6, wherein
    the display unit and the support unit being rolled out in the first operation receive substantially equal forces, and
    the rolled out display unit maintains a flattened state until another operation instead of the first operation is performed by the driving unit.

8. The flexible display device of claim 1, wherein the display unit has a front surface and a back surface opposite the front surface, the front surface or the back surface of the display unit is configured to display images, and wherein during the first operation the back surface of the display unit and a back surface of the support unit come in contact with each other with gradually increasing surface contact area under control of the driving unit, and during the second operation the back surface of the display unit and the back surface of the support unit are separated from each other with gradually decreasing the surface contact area under control of the driving unit.

9. A flexible display device comprising a display unit and a support unit which are rolled in or rolled out by a plurality of driving means and a first shaft and a second shaft, wherein the display unit is configured to be rolled onto or unrolled from the first shaft and the support unit is configured to be rolled onto or unrolled from the second shaft,
- wherein when the display unit and the support unit are rolled out, the plurality of driving means are simultaneously driven in a mode which allows restoring forces of the display unit and the support unit to be directionally opposite to each other in order to offset the restoring force of the display unit and the restoring force of the support unit,
- wherein the display unit is connected to one driving means among the plurality of driving means;
- the support unit is connected to another driving means among the plurality of driving means; and
- when the display unit and the support unit are rolled in, the one driving means connected to the display unit rotates in a first direction to roll the display unit onto the first shaft, and the another driving means connected to the support unit rotates in a second direction opposite the first direction to roll the support unit onto the second shaft, and when the display unit and the support unit are rolled out, the one driving means connected to the display unit rotates in the second direction to unroll the display unit from the first shaft, and the another driving means connected to the support unit rotates in the first direction to unroll the support unit from the second shaft.

10. The flexible display device of claim 9, wherein the support unit has a thickness suitable to have the restoring force of the support unit to be substantially equal to that of the display unit when the display unit and the support unit are rolled out.

11. The flexible display device of claim 9, wherein in order to maintain the display unit in a flattened state by offsetting the restoring force of the display unit when the display unit and the support unit are rolled out, the support unit has a thermal expansion coefficient with a difference below ±5% compared to a thermal expansion coefficient of the display unit.

12. The flexible display device of claim 9, further comprises a connection unit configured to connect one edge of the display unit with one edge of the support unit.

13. A flexible display device comprising:
- a display unit configured to display images;
- a support unit configured to support the display unit;
- a first shaft, wherein the display unit is configured to be rolled onto or unrolled from the first shaft;
- a second shaft, wherein the support unit is configured to be rolled onto or unrolled from the second shaft;
- a first driving means configured to roll or unroll the display unit;
- a second driving means configured to roll or unroll the support unit; and
- a connection unit configured to fasten one edge of the display unit to one edge of the support unit, and wherein the first driving means rotates in a first direction to roll the display unit onto the first shaft and the second driving means rotates in a second direction opposite to the first direction to roll the support unit onto the second shaft when the display unit and the support unit are rolled in, and the first driving means rotates in the second direction to unroll the display unit from the first shaft and the second driving means rotates in the first direction to unroll the support unit from the second shaft when the display unit and the support unit are unrolled.

14. The flexible display device of claim 13, wherein when the display unit and the support unit are unrolled together by the first driving means and the second driving means operating together.

15. The flexible display device of claim 13, wherein when the display unit and the support unit are rotated by the first driving means and the second driving means respectively; the display unit and the support unit are rolled in by being separated from each other until the connection unit is reached.

16. The flexible display device of claim 13, wherein
- the first driving means includes a first driving shaft and first gears disposed at both ends of the first driving shaft,
- the second driving means includes a second driving shaft and second gears disposed at both ends of the second driving shaft, and
- the first driving shaft and the second driving shaft are configured to simultaneously rotate by engaging the first gears with the second gears.

17. The flexible display device of claim 13, wherein
- the first driving means includes a first driving shaft onto which multi-turn coils are attached, first fixation members are disposed at both ends of the first driving shaft, and a first rotating body is configured to wrap the first driving shaft and have a magnetic property; and
- the second driving means includes a second driving shaft onto which multi-turn coils are attached, second fixation members are disposed at both ends of the second driving shaft, and a second rotating body is configured to wrap the second driving shaft and have a magnetic property.

18. The flexible display device of claim 17, wherein
- the first driving shaft and the second driving shaft are fastened, and
- the first rotating body and the second rotating body roll or unroll the display unit and the support unit by rotating in directions that are opposite to each other.

* * * * *